INVENTORS
FRANCO BOTTASSO
ANTONIO PACCIARINI
RENATO CARETTA

BY Stevens, Davis, Miller & Mosher

ATTORNEYS

INVENTOR
FRANCO BOTTASSO
ANTONIO PACCIARINI
RENATO CARETTA

BY Stevens, Davis, Miller & Mosher

ATTORNEY

United States Patent Office 3,713,929
Patented Jan. 30, 1973

3,713,929
METHOD FOR PARTIALLY CURING AND
BUILDING UP PNEUMATIC TIRES
Franco Bottasso, Via Sismondi 9, and Antonio Pacciarini, Via Caracciolo 26, both of Milan, Italy, and Renato Caretta, Via Mameli 28, Gallarate, Italy
Filed May 27, 1970, Ser. No. 40,875
Claims priority, application Italy, May 31, 1969, 17,602/69
Int. Cl. B29h 5/04
U.S. Cl. 156—127
13 Claims

ABSTRACT OF THE DISCLOSURE

A method and apparatus for constructing pneumatic tires capable of producing a tread band of a very high degree of uniformity in the thickness of the band along the entire development of the finished tire. The method includes the steps of building up the carcass, applying the tread band about a rigid annular surface, coaxially disposing the tread band supported by the rigid annular surface in a mold having a plurality of sectors each provided on its inner face with radial sculptures to form the desired recesses in the tread band, heating and compressing the tread band against the rigid annular surface using the sectors of the mold to cause complete penetration of the sculptures in the band and to mold and partially cure the band in a cavity defined entirely by rigid surfaces, removing the rigid annular surface supporting the tread band, positioning the carcass coaxially within the space defined by the tread band, shaping the carcass and forcing the mid-circumferential portion of the carcass against the tread band by admitting a compressed fluid in the carcass and also approaching the beads of the carcass. The apparatus used to carry out the method comprises rigid sectors forming a generally circular ring, the sectors having on their inner surface sculptures to form the desired configuration of the outer surface of the tread of the finished tire which are radially displaced and heated. A rigid ring is coaxially positioned within a space defined by the sectors to define with the sectors a cavity in which the radial sections thereof have a constant form and size, the outer profile of the rigid ring corresponding to the desired outer profile of the carcass of the finished tire. Means are utilized for coaxially supporting the carcass in the space defined by the sectors while the rigid ring is out of the space, together with means for introducing compressed fluid in the carcass and means for moving the beads of the carcass towards each other.

The present invention relates to a method and apparatus for manufacturing pneumatic tires, to produce the highest uniformity in the thickness of the tread band, or of a unit consisting of the tread band and a ring-shaped reinforcing structure, when a reinforcing structure is used, along the entire development of the finished tire.

A process for making pneumatic tires comprising the following steps is already known: applying on a collapsible rigid drum a ring-shaped reinforcing structure and, above it, a tread band; pressing the tread band radially by means of sectors provided with radial sculptures in such a way that they partially penetrate the band, and at the same time folding the edges of the band radially inwardly by means of lateral shaping elements; removing the collapsible drum and inserting in place of it a cylindrical carcass which is converted to a toroidal form by expanding it and by mutually approaching its beads so that the mid-circumferential portion of said carcass can adhere to the ring-shaped reinforcing structure and can press the tread band towards the sectors until the sculptures have completely penetrated the tread band; and then placing the tire fast with the sectors in a curing unit.

However, while this method may be carried out with the aid of very high pressures to effect the penetration of the sectors in the tread band without resorting to a heat treatment, it has been found that it does not produce a constant uniformity in the thickness of the unit constituted by the tread band and by the ring-shaped reinforcing structure along the whole tire development, because the unit is pressed between a rigid surface and a yielding surface.

Moreover, to obtain complete penetration of the sculptures in the tread by pushing the latter radially outwardly, it is necessary to stretch the reinforcing structure, contrary to what is normally desired for radial tires. Finally, this process involves the step of transporting and fitting in the curing unit not only the tire, but also the sectors fast with the latter.

Another method consists in the operations of: applying a ring-shaped reinforcing structure and a tread band on a rigid cylinder; pressing the tread band radially with sectors having a flat inner surface; folding the edges of the tread band inwardly by means of lateral shaping elements; removing the collapsible cylinder and inserting in place of it a cylindrical carcass which is brought to the toroidal shape by expanding it and by mutually approaching its beads so that the mid-circumferential portion thereof may adhere to the ring-shaped reinforcing structure. The sectors are then removed from the outer surface of the tread and the tire is introduced in the mold of a curing unit.

Also, in this case it is not possible to obtain a constant thickness of the unit formed by the tread and by the ring-shaped reinforcing structure, since the mere compression of the unit without the application of heat, even if it is made between two or more rigid surfaces, will not result in a uniform thickness of the same. In fact, to obtain this, it is necessary to heat the rubber to produce a sufficient softness degree in order to allow during said compression the migration of material from those areas where it is in excess to those areas where it is lacking, and to permit discharge of the excess material from the mold.

One of the objects of the present invention is a method for building up pneumatic tires which comprises the steps of: building up the carcass; applying the tread band about a rigid annular surface; disposing the tread band supported by said rigid annular surface, coaxially in a circular mold having a plurality of sectors each provided on its inner face with radial sculptures to form the desired recesses in the tread band; heating and simultaneously compressing centripetally the tread band against the rigid annular surface supporting it by means of the sectors of the mold, so as to cause complete penetration of the sculptures in the band and to mold and partially cure the band in a gauged annular cavity completely defined by rigid surfaces; mutually detaching the rigid annular surface supporting the tread band and the rigid annular surface; positioning the carcass coaxially within the space defined by the tread band; shaping the carcass and fastening its mid-circumferential portion against the tread band by admitting a compressed fluid inside the carcass and by mutually approaching its beads.

Alternatively, a reinforcing structure can be interposed between the rigid annular surface and the tread band. The carcass can be positioned in the space defined by the tread band or by the possible ring-shaped reinforcing structure either in cylindrical shape or after having suffered a partial shaping and a possible partial curing.

This method, as regards the molding and the partial curing of the tread band or of a tread band unit having a ring-shaped reinforcing structure, and the joining of the carcass to such elements, following the molding, can be advantageously carried out on the press to be subsequently used for curing the tire.

A further object of the present invention is the provision of apparatus for carrying out the method which comprises a plurality of rigid sectors constituting a circular ring, whose inner surface has the exact profile desired for the outer surface of the tread of the finished tire. These sectors are each provided on its inner surface with sculptures corresponding to the recesses to be formed on the outer surface of the tread, and are radially displaced and heated at least at their inner surface. A rigid ring adapted to be coaxially positioned within the space defined by said sectors so as to define with them a cavity, whose radial sections have a strictly constant form and size, is used. The outer profile of the rigid ring corresponds to the preestablished outer profile of the carcass in the finished tire. Means are provided for supporting a carcass coaxially in the space defined by the sectors while the rigid ring is out of the space, together with means for mutually approaching the carcass beads and means for admitting compressed fluid inside the carcass.

The apparatus may also comprise two continuous mold sections for receiving the tire sidewalls, and at least one of them may serve as a means for supporting the carcass coaxially in the space defined by the central section of the mold constituted by sectors.

Moreover, provision can be made of a membrane within which compressed fluid is introduced for shaping the tire and for subsequent curing.

The features and the advantages of the method and of the apparatus forming the subject matter of the present invention will be more clearly apparent from the following description, made with reference to a practical embodiment illustrated by way of non-limiting example in the accompanying drawings, in which.

Figure 1:
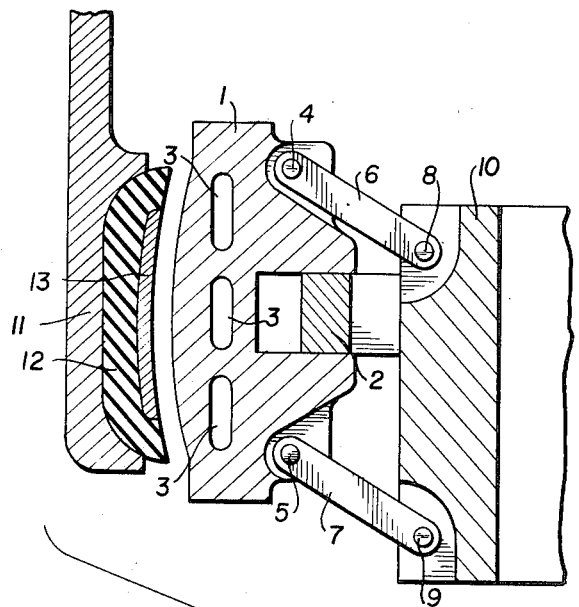
FIGS. 1 and 2 show two steps of the application of a unit consisting of a tread band and ring-shaped reinforcing structure about a rigid cylindrical surface supporting it and having a plurality of sectors.
Figure 2:
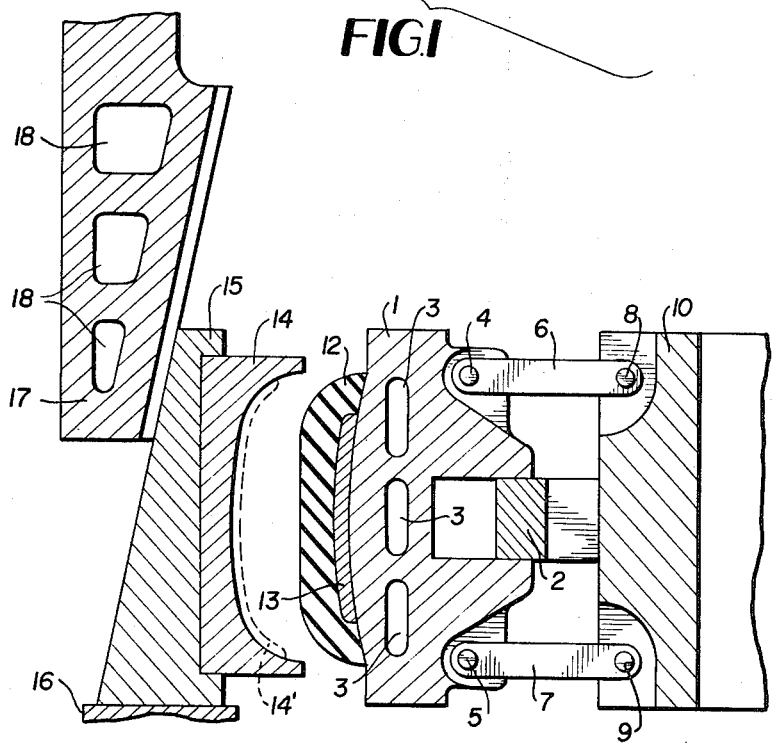
Figure 3:
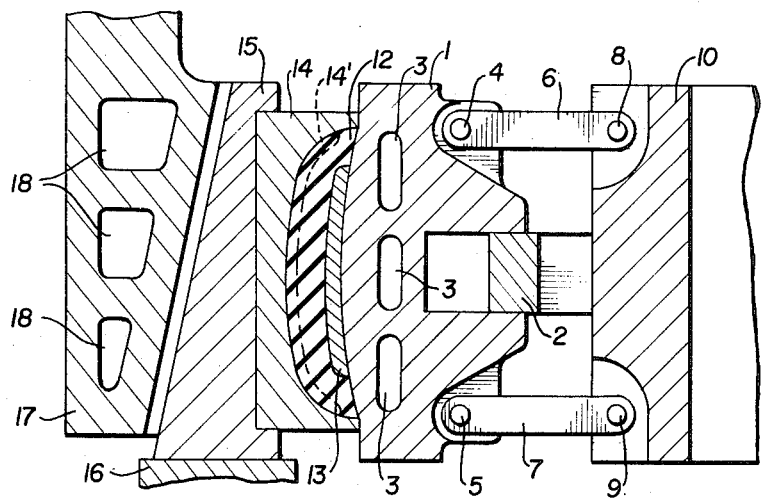
FIG. 3 illustrates a step of the molding and partial curing of the unit in the annular cavity defined by the supporting rigid surface and by a sector mold.
Figure 4:
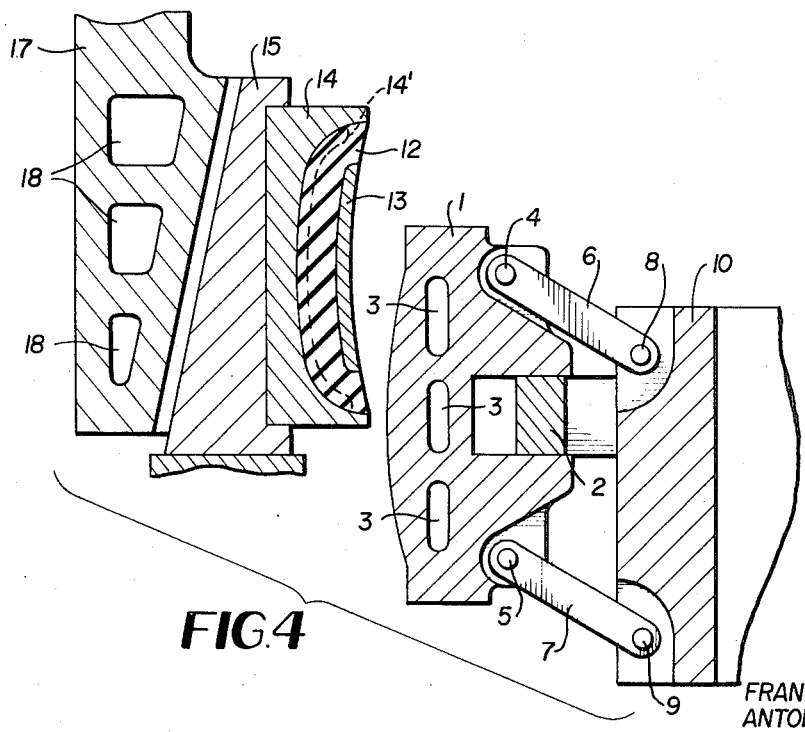
FIG. 4 shows the step of removing the rigid supporting ring from within the unit.

The apparatus represented in the above indicated figures comprises a collapsible rigid ring, for instance of the type described in U.S. Pat. No. 3,358,330, issued on Dec. 19, 1967, to the applicant, which has a plurality of inner sectors 1, radially slidable on a supporting ring 2.

The sectors 1 are provided with cavities 3 for the circulation of a heating fluid and are each provided with two pins 4 and 5, to which is pivoted one end of a set of levers 6 and 7, the other end of which is pivoted to pins 8 and 9 supported by a central block 10 axially displaceable in opposite directions to cause radial sliding of the sectors 1 along supporting ring 2. The distance between the pins on which levers 6 and 7 are pivoted and the width of the sectors are different for two contiguous sectors, so that one of them can be further displaced towards the block 10 to permit movement in the same direction of the two sectors contiguous to it, when the drum is in completely expanded position.

Provision is further made of a sector loader 11 to bring the unit (shown in FIG. 1 as a tread band 12 having a ring-shaped reinforcing structure 13) telescopically about the rigid drum in collapsed position.

The apparatus also has a plurality of outer sectors 14 provided on their inner face with sculptures 14' corresponding to the recesses desired to be obtained in tread band 12. The sectors 14 are integral with an equal number of supports 15, radially slidable in opposite directions on an annular plane 16. The supports 15 have externally an inclined surface, along which a corresponding member, having the same inclination in the form of a ring 17 provided with cavities 18 for the circulation of a heating fluid, is slidable in opposite directions.

For shaping the carcass, if it is not airtight, there is a cylindrical or toroidal membrane 19, whose thickened edges 20 and 21 are respectively clamped between disc 22 and a ring 23, and between a continuous circular mold section 24, corresponding to one of the sidewalls of the finished tire, and ring 25. Another continuous circular mold section 26, corresponding to the other side of the tire, completes the mold for the latter.

The continuous circular sections 24 and 26 can be axially displaced, simultaneously and at the same speed, from two positions symmetrical with respect to the mid-circumferential plane of the tread band. Section 26 can be removed independently of section 24.

In carrying out the method of the present invention, the ring-shaped reinforcing structure 13 and the tread band 12, preferably immediately after its extrusion and therefore in hot condition, are coupled on a collapsible rigid drum of conventional type and the resulting assembly is mounted on the sector loading device 11. Then, the rigid ring is positioned in the space defined by the unit consisting of the tread band 12 and the ring-shaped reinforcing structure 13. The sectors 1 of this ring must be in a position collapsed towards the drum axis; that is, the levers 6 and 7 must be inclined with respect to the horizontal direction, so that the mid-circumferential plane of sectors 1 coincides with that of the assembly formed by the tread band 12 and by the ring-shaped reinforcing structure 13. At this time the block 10 is lifted until the levers 6 and 7 reach the horizontal position, and the outer surface of sectors 1 contact the ring-shaped reinforcing structure 13. Then, the sectors 11 of the loader are removed and the rigid ring, with the assembly consisting of tread band 12 and the ring-shaped reinforcing structure 13, is positioned in the space defined by the sectors 14 spaced apart from each other. Then, the ring 17 is lowered so that its inclined planes slide along the inclined surface of supports 15 and the sectors 14 are radially pushed against the tread band 12 whereby radial sculptures 14' completely penetrate the tread band.

After the centripetal displacement of the sectors 14, the assembly consisting of tread band 12 and ring-shaped reinforcing structure 13 is completely compressed between the rigid surfaces of the sectors 1 and of the sectors 14 which, being heated by the fluid circulating in the vacities 3 and 18, causes sufficient softening of the rubber to allow the excess to fill the zones wherein the material is lacking, or to leave the mold through the usual discharge opening, and the rubber in the mold again takes a greater consistency as a result of its partial curing.

Accordingly, the assembly 12–13 shows in all of its radial sections form and size, which are maintained strictly constant by virtue of the partial curing to which it has been subjected. The block 10 is then lowered to detach the sectors 1 from the ring-shaped reinforcing structure 13 and to bring them in collapsed position to facilitate the mutual separation of said sectors 1 and of the assembly 12–13.

Figure 5:
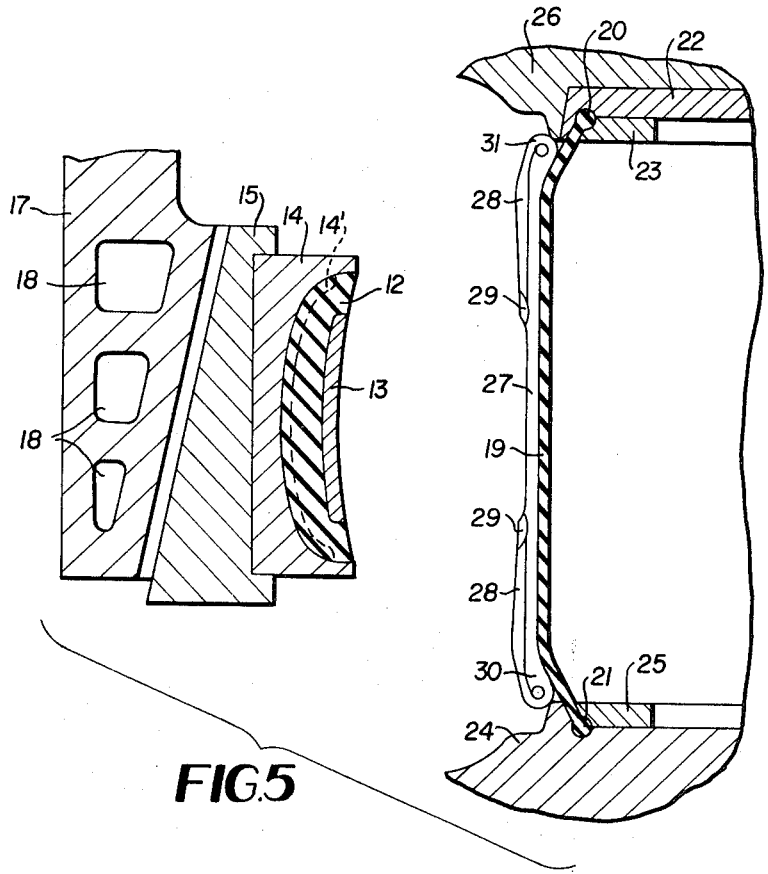
FIG. 5 represents the step of introducing the carcass provided with sidewalls, in the space defined by the unit.
Figure 6:
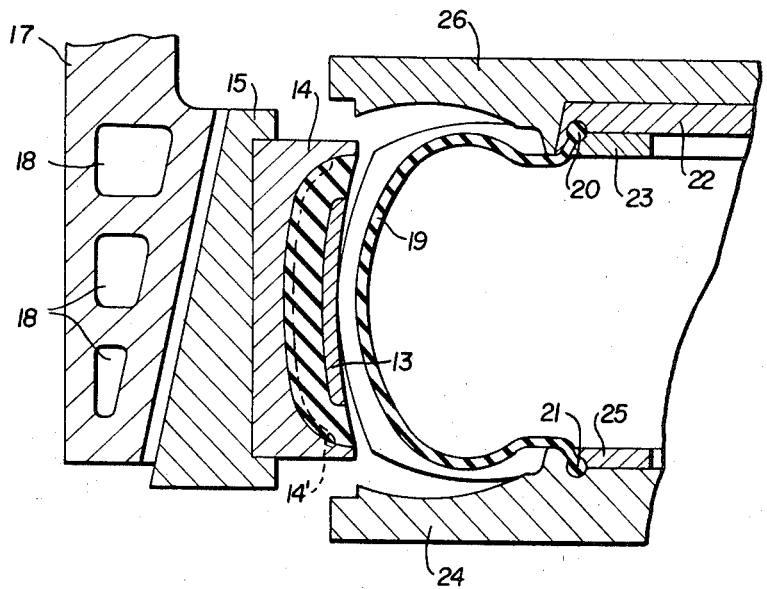
FIG. 6 shows the step of shaping the carcass and the beginning of the closure of the sidewalls within two sections of the mold.
Figure 7:
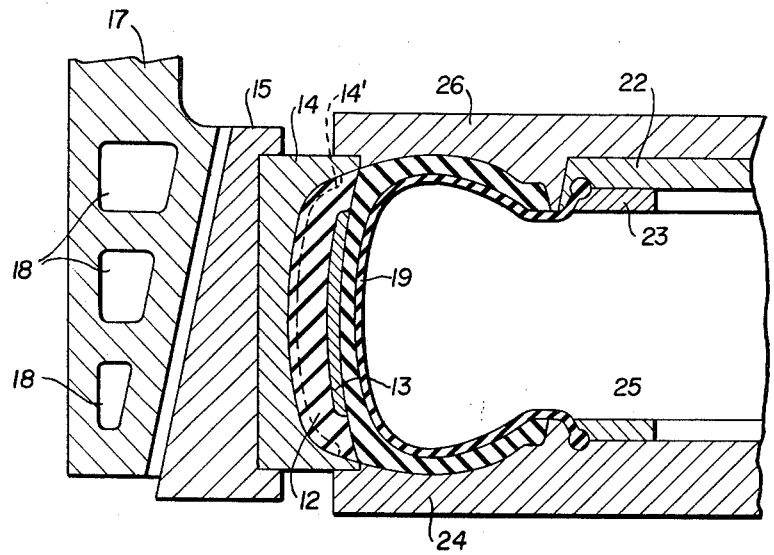
FIG. 7 represents the tire completely enclosed within the mold during the curing step.

Then, as best shown by FIG. 5, membrane 19 is positioned in the unoccupied space, together with the supports of its thickened edges 20 and 31. Carcass 27, provided with the sidewalls 28 and strips 29, made of the same compound forming the tread band and integral with said sidewalls 28, is telescopically inserted about the membrane 19. The carcass 27 is arranged with its bead 30 on the continuous circular section 24, so that its median plane corresponds to the plane of the assembly 12–13. Then, continuous circular section 26 is brought into contact with the other bead 31 of the carcass 27. At this moment continuous circular sections 24 and 26, and therefore beads 30 and 31 in contact with them, are mutually and symmetrically approached with respect to the median plane of assembly 12–13, and at the same time a compressed fluid is introduced into membrane 19. The carcass 27 is consequently brought gradually to its final toroidal shape and adheres to the ring-shaped reinforcing structure 13. As shown in FIG. 7, the two circular sections 24 and 26 are brought into contact with the sectors 14 by simply closing the mold and then the tire is cured in a conventional way. During this latter operation, strips 29 firmly adhere to the edges of the tread band 12, completing it.

It should be understood that some modifications can be made both to the method and to the apparatus as described above, and still be within the concept and scope of the present invention. For example, the carcass can be built up in cylindrical form and can be partially shaped, and preferably partially cured separately, either before or during the application of the tread band on the annular supporting surface, and the arrangement of the tread band coaxially in the mold and the molding and partial curing of the same.

The application of the ring-shaped reinforcing structure and of the tread band on the annular supporting surface may be carried out by winding this assembly directly on the annular surface, without the aid of a loader.

In some cases, it may be more advisable to provide the tread band with lateral edges, formed by the same material constituting the sidewalls, instead of providing the tire sidewalls with edges of the same material of which the tread band is made.

Also, the sidewall strips can be applied to the carcass while this is built up, or after being joined to the tread band or the ring-shaped reinforcing structure.

The shaping of the carcass and its joining with the tread band can be carried out by maintaining one of the carcass beads stationary and by displacing axially in the same direction both the other carcass bead and the sectors enclosing the tread, the former being displaced at a speed double that used to displace the latter.

The apparatus can be pre-arranged so that the movements referred to in the description of the embodiment illustrated in the drawings can be reversed. Thus, the sectors in which the tread band is molded can be inserted about the rigid ring supporting the tread and about the membrane, instead of inserting these elements inside the sectors. Also, ring 17 may be stationary and the inclined surfaces of supports 16 can be slidable along the planes of the ring.

Further, at least one of the circular sections adapted to enclose the tire sidewalls can be constituted by sectors which can be temporarily moved away from the zone concerned by the carcass when the mid-circumferential portion of the latter is brought into contact with the tread band, or with the ring-shaped reinforcing structure.

What is claimed as new is:

1. A method of building pneumatic tires which comprises:
    (1) providing a carcass;
    (2) disposing a tread band about an annular rigid surface;
    (3) disposing the tread band while supported by said rigid surface coaxially in a circular mold having a gauged cavity defined by sectors each carrying radial sculptures corresponding to recesses to be formed in the tread band;
    (4) heating and simultaneously compressing centripetally the tread band in said cavity and against the said annular rigid surface until recesses corresponding to the sculptures are formed in the tread band and the tread band is partially cured;
    (5) removing the annular rigid surface from the tread band;
    (6) disposing a tire carcass having beads at the edges thereof against the tire band while it remains disposed in its same position in the said cavity;
    (7) shaping the carcass and joining it to the tread band by introducing fluid under pressure into the carcass while simultaneously moving the beads of the carcass towards each other.

2. A method as in claim 1, in which the carcass is built up before the molding and the partial curing of the tread band.

3. A method as in claim 1, in which the carcass is built up at least partially during the application of the tread band on the annular rigid surface and the positioning of said tread band coaxially in the mold and the molding and partial curing thereof.

4. A method as in claim 1, in which a tread band having edges made of the same compound forming the tire sidewall is applied about said annular rigid surface.

5. A method as in claim 1, in which the tread band is applied on the annular rigid surface, in a hot condition corresponding to its condition upon being discharged from an extruder in which it has been produced.

6. The method of claim 1 wherein the carcass is at least partially shaped before it is disposed in the mold.

7. The method of claim 6 wherein the carcass is partially cured after it has been partially shaped.

8. A method of building pneumatic tires which comprises:
    (1) providing a carcass;
    (2) disposing a ring-shaped reinforcing structure and a tread band about an annular rigid surface with the ring-shaped reinforcing structure against the said rigid surface;
    (3) disposing the tread band and said reinforcing structure while supported by said rigid surface coaxially in a circular mold having a gauged cavity defined by sectors each carrying radial scultures corresponding to recesses to be formed in the tread band;
    (4) heating and simultaneously compressing centripetally the tread band and reinforcing structure in said cavity and against the said annular rigid surface until recesses corresponding to the scultures are formed in the tread band and the tread band is partially cured;
    (5) removing the annular rigid surface from the tread band and reinforcing structure;
    (6) disposing a tire carcass having beads at the edges thereof against the reinforcing structure while it is disposed in said cavity;
    (7) shaping the carcass and joining it to the tread band by introducing fluid under pressure into the carcass while simultaneously moving the beads of the carcass towards each other.

9. A method as in claim 8, in which the carcass, before being inserted in the space defined by the tread band and the ring-shaped reinforcing structure, is provided with sidewall strips.

10. A method as in claim 8, in which the carcass is provided with sidewall strips after it has been inserted in the space defined by the tread band and the ring-shaped reinforcing structure.

11. A method as in claim 9, in which each side wall strip, in its portion farthest from the carcass beads, is provided with a strip having the same composition is that of the material constituting the tread band.

12. A method as in claim 8, in which the residual heat generated by the curing of the previously treated tire is used for heating the tread band and ring-shaped reinforcing structure.

13. A method as in claim 8, in which the tread band and ring-shaped reinforcing structure are maintained, during curing of the tire in the same position they had during their molding and partial curing.

References Cited

UNITED STATES PATENTS

| | | | |
|---|---|---|---|
| 2,814,331 | 11/1957 | Vanzo et al. | 156—123 X |
| 2,672,914 | 3/1954 | Weigold et al. | 156—125 |
| 3,464,874 | 9/1969 | Ragan | 156—96 |
| 844,820 | 2/1907 | Marks | 156—128 R |
| 2,476,884 | 7/1949 | Maynard | 156—125 |
| 1,167,009 | 1/1916 | Nall | 18—17 K |
| 2,724,425 | 11/1955 | Ostling | 156—125 |
| 3,218,209 | 11/1965 | Travers et al. | 156—127 X |

FOREIGN PATENTS

| | | | |
|---|---|---|---|
| 1,252,409 | 10/1967 | Germany | 156—394 |
| 723,621 | 12/1965 | Canada | 156—126 |

STEPHEN C. BENTLEY, Primary Examiner

U.S. Cl. X.R.

156—287; 425—42